Aug. 25, 1964 R. M. JORDA ETAL 3,145,773
METHOD OF SEALING FORMATIONS IN COMPLETED WELLS
Filed April 12, 1960 3 Sheets-Sheet 1
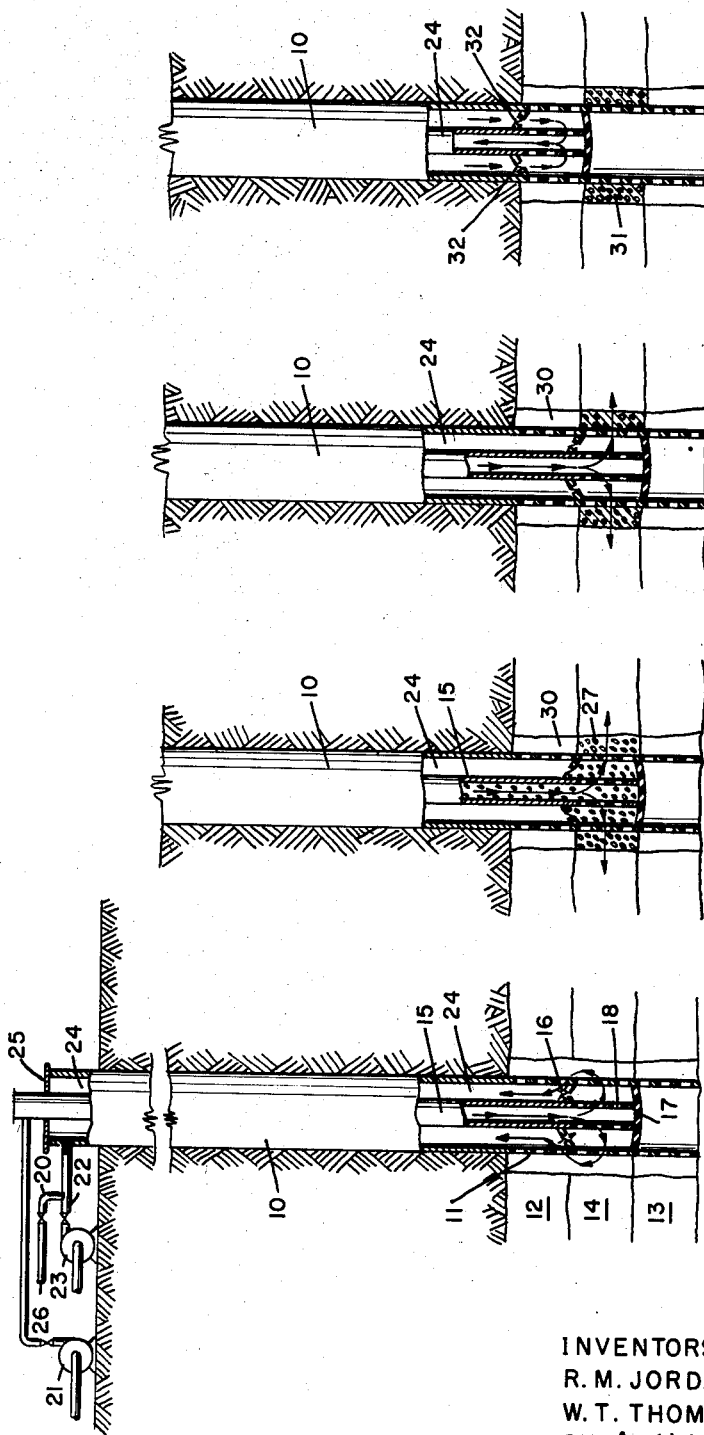
INVENTORS
R. M. JORDA
W. T. THOMPSON
BY J. H. McCarthy
THEIR AGENT Aug. 25, 1964

R. M. JORDA ETAL 3,145,773

METHOD OF SEALING FORMATIONS IN COMPLETED WELLS

Filed April 12, 1960

INVENTORS
R.M. JORDA
W.T. THOMPSON
BY A. H. McCarthy
THEIR AGENT

Aug. 25, 1964   R. M. JORDA ETAL   3,145,773
METHOD OF SEALING FORMATIONS IN COMPLETED WELLS
Filed April 12, 1960   3 Sheets-Sheet 3

INVENTORS
R.M. JORDA
W.T. THOMPSON
BY J. H. McCarthy
THEIR AGENT

United States Patent Office 3,145,773
Patented Aug. 25, 1964

---

3,145,773
METHOD OF SEALING FORMATIONS IN COMPLETED WELLS
Robert M. Jorda and William T. Thompson, Houston, Tex., assignors to Shell Oil Company, New York, N.Y., a corporation of Delaware
Filed Apr. 12, 1960, Ser. No. 21,803
3 Claims. (Cl. 166—27)

This invention relates to a method of sealing one or more selected formations traversed by a well in which a well casing has been installed and cemented in the well. The invention pertains more particularly to a method of selectively treating one or more formations traversed by a cased well in order to isolate one or more oil, water, gas or other producing strata traversed by the well or to seal off a formation producing a fluid which would tend to contaminate a hydrocarbon production fluid.

In many oil fields it is often desirable to seal off formations adjacent an oil or gas formation, generally in order to prevent contaminating the oil from the producing formation with water or salt water from an adjacent formation, either above or below the oil-producing formation. While, in general, water-producing formations are normally sealed off by cementing operations at the time a well casing is installed in the well, it is not uncommon that such a formation must be sealed off after the well casing has been installed.

It is therefore a primary object of the present invention to provide a method whereby a water-producing formation may be readily sealed off after a well casing has been permanently installed in a well.

In many oil fields a well may traverse more than one oil-producing formation. The oils of two different formations may have different characteristics so that it is desirable to produce the oils from these formations through separate production strings. It is therefore another object of the present invention to provide a method for sealing the annular space outside a well casing between two producing zones so that oils from the zones do not become intermixed, nor will there be any chance for the oil to flow into a porous formation between the two producing zones.

A further object of the present invention is to provide a method whereby a chemically-distintegratable plug may be set in the annular space outside a well casing to seal off an undesirable formation adjacent an oil-producing zone or intermediate two oil-producing zones.

Another object of the present invention is to provide a method of positioning and then subsequently removing a formation sealing plug in the annular space between a casing and the borehole wall without injuring the casing.

A still further object of the present invention is to provide a method for chemically sealing a selected formation adjacent an oil-producing zone or between two oil-producing zones without contaminating or otherwise affecting the faces of the oil-producing zone or zones.

These and other objects of this invention will be understood from the following description taken with reference to the attached drawing, wherein:

FIGURES 1 to 4 are diagrammatic views schematically illustrating the various steps in which the method of the present invention is performed to seal off a zone having a permeability which is materially greater than that of adjacent oil producing zones.

Figure 8:
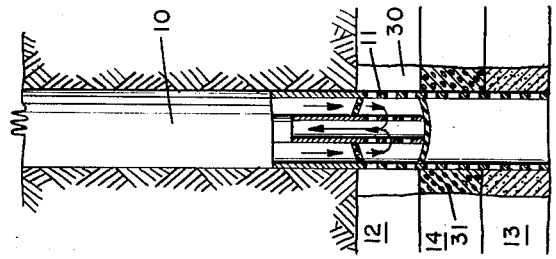
FIGURES 5 through 8 are diagrammatic views schematically illustrating the steps of the present method when it is desired to seal off the formation having a permeability less than or equal to adjacent oil producing zones.

The method of the present invention comprises the selective sealing of one or more formations traversed by an oil well to prevent communication between an oil-producing zone and other undesirable zones, or, in a water injection well, between the water injection zone and other undesirable zones. A unique feature of the present invention is that the method can be reversed at any time by chemical treatment to remove the seal from the selected formation.

Referring to FIGURE 1 of the drawing, a well is shown as having a well casing 10 installed therein. The lower end of the well casing 10 has a perforated section 11 which may extend through one or more hydrocarbon producing zones 12 and 13, as well as through one or more other formations 14 which it is desirable to seal off. The formations to be sealed-off may be of any of several types, such, for example, as a water or salt-water producing formation whose water would contaminate the oil being produced in the well, or an extremely porous formation which would tend to receive oil from the oil-producing formation. In the event that water-flooding operations were to be carried out in the formation illustrated in FIGURE 1, it would be desirable to seal off any porous formations in zone 14 so that the injected water would tend to enter and drive the oil from the producing zones 12 and 13.

Although element 11 has been described as being a perforated section of well casing 10, it is understood that any suitable type of well screen or other perforate element normally used in a well installation of this type may be used instead of a perforated casing section. Additionally, there is no restriction as to the shape or form of the perforations in the perforate section 11. While normal perforations would be round, or rectangular if they are in the form of slots, they may be of any desired shape or size. Additionally, while the perforate section of casing 11 is shown as having perforations throughout the entire length of zone 14, it is to be understood that these perforations may either be in the originally installed perforate section 11 or may be formed therein in any accepted manner, as by shooting, just prior to the time that the well is to be treated in the manner of the present invention.

Positioned within the well casing 10 is a pipe string 15 having secured to its lower end a straddle packer which takes the general form of a pair of packers 16 and 17 positioned on the pipe string 15 on either side of one or more fluid ports 18 therein. The spacing between the two packers 16 and 17 may be of any desired distance, generally being equal to that of the zone 14 to be sealed off. The upper end of the pipe string 15 extends to the surface where it is connected to the discharge of a pump 21. A conduit 22, which forms a discharge of the pump 23, is shown as being connected to the well casing 10 and is in communication with the annular space 24 between the pipe string 15 and the casing 10. Although the well casing 10 is shown as being provided with a well closure means 25, in some cases it is not necessary to have the well casing closed when practicing the method of the present invention. Conduit 22 is also provided with a bypass conduit 26 which is open when it is desired to discharge fluid up the annulus 24 and out the well.

When it is known that perforations exist in the well casing 10 opposite the zone 14 to be sealed off, the pipe string 15 is inserted into the well casing 10 so that the straddle packer 16–17 is positioned on either side of the zone to be sealed off. A slurry of oil or water and a particulate solid material is pumped down through the pipe string 15 and through the perforations in the well casing opposite the zone to be sealed. Since the zone 14 to be sealed is more permeable than the adjacent production zones 12 and 13, the particles of the solid material will tend to form a mass on the surface of the formation 14. There is little or no tendency for the particles to rise and deposit on the producing zone 12 as the annulus 24 is full of fluid and the flow of fluid is into the more permeable formation 14.

Figure 10:
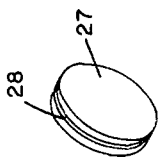
FIGURE 10 is an isometric view showing one form of a particle to be employed in accordance with the present method.

The particles of solid material being pumped down through the pipe string 15 and through the perforations in the well casing may take various forms. A particularly suitable type of particle, as illustrated in FIGURE 10, is a substantially disc-shaped piece of a permeable elastic sponge material which contains an impermeable film or layer extending along the longest plane through the cellular structure making up the particle 27. The impermeable film or membrane 28 may pass through the center of the disc-shaped particle 27 to form one face thereof. It is not essential that the particles 27 be entirely impermeable as long as they are less permeable than the formation to be sealed off. The particles 27 are preferably elastic and of any shape which has at least one diameter large enough to inhibit any free flow of the particle from a position outside the perforate casing 11 to the inside after pump pressure has been removed from the inside. Thus, the elastic particles may be of any size that can be deformed under pump pressure and be forced through the perforation or slots. Preferably the particles are slightly larger than the perforations.

It is, however, to be understood that it is not essential that the particles 27 which are used in the present method must be elastic particles having a diameter or dimension larger than the openings in the perforate well casing 11. As an alternative, particles of a size equal to or less than the size of the perforations may be used if they are made of a material which can be caused to expand or increase in size after the particles have been forced through the perforate section of the well casing. For example, certain polyurethane resin formulations expand when further polymerized. Thus, a high molecular weight polyisocyanate (e.g., the reaction product of hydroxy-containing polyester plus toluene diisocyanate) when mixed with water and an amine catalyst will further expand. Particles of prepolymer are relatively solid and impermeable and are easily deformable. These particles of the prepolymer, either larger or smaller than the perforations in the well casing, can be suspended in a suitable liquid and pumped down the pipe string 15 in accordance with FIGURE 2 where they would accumulate against the formation 14 to be sealed. The accumulated mass of particles is then both expanded and cemented together by pumping down through pipe string 15 a liquid containing an organic catalyst adapted to initiate further polymerization of the prepolymer, as shown in FIGURE 3.

In the event that particles of other materials are employed, such for example as the discs previously described with regard to FIGURE 4, elastic spheroids of sponge rubber, solid rubber, cellulose sponge particles, etc., they may be either in the shape of discs, spheres, cubes or any other shape which is of a size that may be forced through the perforations in the well casing. In FIGURE 3, a quantity of particles is shown as being accumulated and compressed in a mass within the annular space 30 between the perforated well casing and the adjacent formation. Since the particles are elastic and have a relatively low permeability, in the event that they plug any of the openings in the conduit the pressure differential across the particles deforms or compresses them and the fluid flow through the perforations carries the particles into the annular space 30. When the particles are tapped against the face of the permeable formation 14, the continued flow of fluid compresses them in the plane of the formation until the annular space is substantially filled with particles which are compressed in that plane. The elasticity of the particles when under pressure against the face of a formation causes them to expand in directions and to dimensions which inhibit their return into the perforated well casing.

At the stage shown in FIGURE 3, a fluid cementing agent of any suitable type is pumped down the pipe string 15 and into the pack of particles adjacent the zone 14 so as to flow through the interstices of the pack and cement them together in a solid mass. In the event that an insoluble cementing agent is preferred, an epoxy resin plus a curing agent may be employed. If, on the other hand, a soluble cementing agent is desired, a solvent-soluble thermoplastic resin such as methyl methacrylate emulsion, which is soluble in acetone may be employed. To dissolve the cementing agent at a later time acetone could be pumped down the well. Polyurethane prepolymer particles can be cemented together by washing with a dilute solution of an amine catalyst; inhibited sulfuric acid may be employed to remove the cemented bond. If the particles are polystyrene, a dilute solution of tetrachloroethane is especially good as a cementing agent as only the outer edges of the particles become cemented together; several washes of normal strength tetrachloroethane may be used to remove the bond. For rubber particles, a cementing agent such as No. 910 adhesive, manufactured by Eastman Kodak Company of Rochester, New York, is especially good. Because the particles are compressed, good cementation is obtained and an effective seal is formed on the zone 14 to be sealed. Preferably, the best seals are formed when the cementing agent is of a type that will react with the particles to form a solid mass.

After the plug 31 of particles has been cemented in place, as shown in FIGURE 4, the pipe string 15 and the packers 16 and 17 are removed. Preferably a reverse flush is carried out at this time with clean fluid being pumped down through the annulus 24 and through the upper packer 16 to flush any of the excess sealing materials up the pipe string 15 and out the well. The upper packer may be of the type that is remotely releasable to permit the indicated flow, or may be provided with check valves 32, as illustrated.

Figure 5:
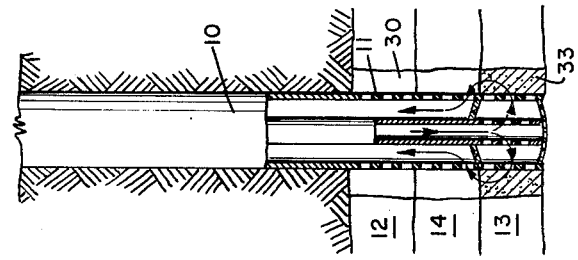

When the method of the present invention is used to seal certain formations 14 which are positioned intermediate to oil producing zones 12 and 13, as shown in FIGURE 5, a bailable sand pack 33 is first positioned in the annulus 30 outside the perforated section 11 of the well casing 10 so that the face of the lower production zone is entirely covered with the sand. This may be done by lowering the pipe string 15 and its straddle packer 16–17 so that the upper packer 16 is substantially at the top of the lower production zone 13. A slurry of either oil or water and sand would then be pumped down the pipe string and out the perforations in the casing. Any excess sand and slurry would be recirculated to the surface of the well.

Figure 7:
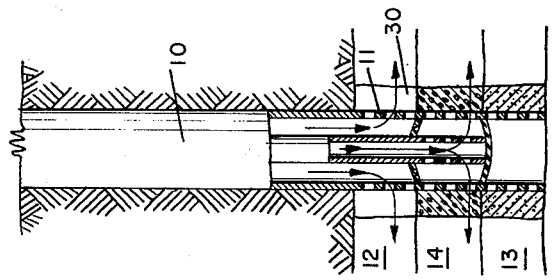
Figure 6:
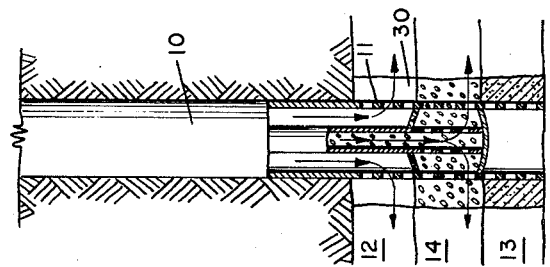

As shown in FIGURES 5 through 8, the method to be employed when the zone 14 to be sealed off is of a permeability equal to or less than the oil zones is much the same as the method described hereinabove with regard to FIGURES 1 to 4. However, since the permeability of the zone 14 to be sealed off is not greater than the producing zones 12 and 13, there is a danger that the sealing particles 27 would tend to accumulate opposite the production sands 12 and 13 and thereby hinder subsequent oil production from the well. The sand pack 33 protects the lower producing zone 13 while the upper producing zone 12 is protected by pumping a fluid, preferably oil, down the annulus 24 while simultaneously pumping the mixture of oil or water and sealing particles down the pipe string 15. The rates and pressures of the two fluid flows are adjusted so that the sealing particles 27 remain opposite the formation 14 to be sealed. Flow of oil is also maintained down the annulus 24 while the sealing liquid is being pumped down the pipe string 15 and into the mass of sealing particles as shown in FIGURE 7. After the plug of material 31 has been formed, as shown in FIGURE 8, the well casing is preferably back-flushed in a manner described with regard to FIGURE 4.

Figure 9:
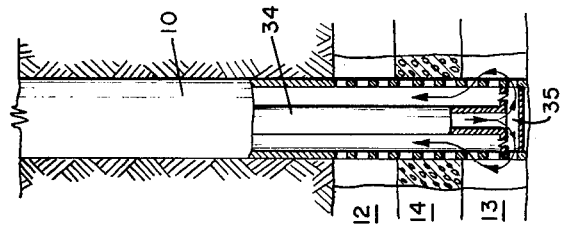
FIGURE 9 is a diagrammatic view schematically illustrating a method of washing out a bailable sand pack which is positioned adjacent a lower oil-producing zone prior to sealing off an undesirable formation thereabove.

With the pipe string 15 and the straddle packer 16–17 of FIGURE 8 removed from the well casing 10, a second pipe string 34 (FIGURE 9), having a T-shaped or cylindrical washing head 35 secured to its lower end, is run into the well casing 10 to the bottom of the lower producing zone 13. Fluid, preferably oil, is pumped down the pipe string 34 to be discharged out through the perforations in the lower end of the well casing 10 causing the sand pack outside the well casing to be circulated into the well casing through perforations above the washing head 35. In this manner the sand pack 33 (FIGURE 5) is removed from the well so that both oil-producing zones 12 and 13 are clean and adapted to be put on production.

Figure 14:
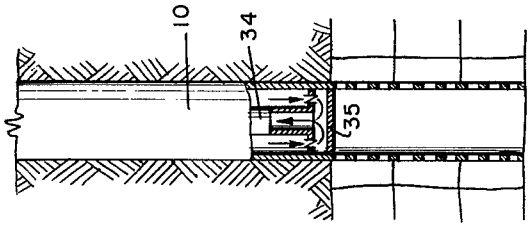
FIGURES 11 through 14 are diagrammatic views illustrating the steps of removing a strata-sealing plug which has been set in accordance with the method of the present invention.
Figure 13:
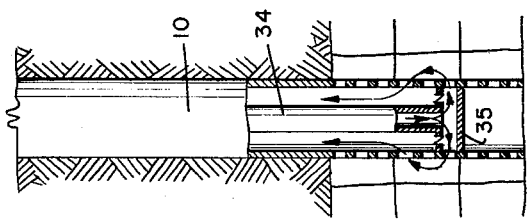
Figure 12:
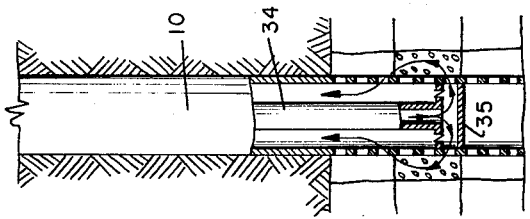
Figure 11:
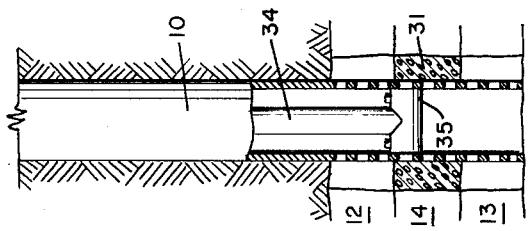

A unique feature about the method of the present invention is that it may be reversed so that a sealed-off formation may be readily opened whenever necessary. As shown in FIGURES 11–14 the washing tool 35 of FIGURE 9 may be run into the well on pipe string 34. A chemical solvent of any suitable type which causes disintegration of the plug 31 made up of particles and sealing materials is pumped through the pipe string 34 and washing head 35 and out through the perforations near the top of the pack 31 to dissolve the pack. As the pack dissolves, the dissolved material is washed, by fluid discharged from the washing tool, through perforations in the well casing above the washing tool and thence up the annulus 24 to the surface. After disintegration of the formation seal or plug is complete (FIGURE 13), the well casing may be flushed out by reversing circulation of fluid so as to pump the fluid down the annulus and up the pipe string 34, as shown in FIGURE 14. Any suitable solvent may be employed to dissolve the pack. In the event that cellulose particles and cellulose cementing materials are used to form a plug, it may be disintegrated with sulfuric acid. In all cases the materials to be employed in performing the method of the present invention are those that would not be detrimental to the producing formations.

We claim as our invention:

1. In the production of oil and gas wells wherein a well traverses a hydrocarbon-producing formation as well as a lower and more permeable second formation to be sealed off, the method of sealing off said second formation in a well containing a casing string which has been provided with perforations at least at a level adjacent said hydrocarbon-producing formation and the formation to be sealed, said method comprising inserting through said casing string a pipe string having packer means carried at the lower end thereof, positioning said packer means against said casing wall in a fluidtight manner to isolate a portion of the casing string at a level opposite the formation to be sealed, pumping down through said pipe string a fluid containing a quantity of particulate solid material sufficient in volume to fill the elongated annular space outside the well casing adjacent the formation to be sealed, the particles of said solid material being made of a plastic polymer capable of expansion upon further polymerization and being of a size and shape such that they are adapted to pass through the isolated perforations of said well casing, forcing said particulate solid material under fluid pressure through said isolated perforations of said casing string, subsequently pumping a polymerizing fluid down said pipe string and through said isolated perforations and into the interstices of said mass of particulate solid material causing said particles of solid material to expand to form an impermeable mass effectively sealing off said formation to be sealed, and withdrawing said pipe string and packer means from said well casing.

2. In the production of oil and gas wells wherein a well traverses a hydrocarbon-producing formation as well as a lower and more permeable second formation to be sealed off, the method of sealing off said second formation in a well containing a casing string which has been provided with perforations at least at a level adjacent said hydrocarbon-producing formation and the formation to be sealed, said method comprising inserting through said casing string a pipe string having straddle packer means carried at the lower end thereof, positioning said straddle packer means against said casing wall in a fluidtight manner to isolate a portion of the casing string at a level opposite the formation to be sealed, pumping down through said pipe string a fluid containing a quantity of particulate solid material sufficient in volume to fill the elongated annular space outside the well casing adjacent the formation to be sealed, the particles of said solid material being made of a plastic polymer capable of expansion upon further polymerization and being of a size and shape such that they are adapted to pass through the isolated perforations of said well casing, forcing said particulate solid material under fluid pressure through said isolated perforations of said casing string, pumping a polymerizing fluid down said pipe string and into contact with said particles of solid material to cause said particles of solid material to be further polymerized and expand sufficiently to prevent their free flow back through the perforations, subsequently pumping a sealing fluid down said pipe string and through said isolated perforations and into the interstices of said mass of particulate solid material to form an impermeable mass effectively sealing off said formation to be sealed, and withdrawing said pipe string and packer means from said well casing.

3. In the production of oil and gas wells wherein a well traverses a pair of hydrocarbon-producing formations as well as an intermediate formation producing an unwanted contaminating fluid, the method of sealing off the intermediate formation in a well containing a casing string which has been provided with perforations at least at a level adjacent said hydrocarbon-producing formations, said method comprising perforating said casing string opposite the zone of formation to be sealed, inserting through said casing string a pipe string having straddle packer means carried at the lower end thereof, positioning said straddle packer in the well casing at least at the top of the lowermost hydrocarbon-producing formation, pumping a liquid and sand slurry down the pipe string and through the perforated well casing to form a sand pack over the entire face of the lowermost hydrocarbon-producing formation, positioning said packer means against said casing wall in a fluidtight manner at a level so as to isolate the perforations in the casing opposite the formation to be sealed, pumping down through said pipe string a fluid containing a quantity of particulate solid material sufficient in volume to fill the elongated annular space outside the well casing adjacent the formation to be sealed, the particles of said solid material being of a size and shape and structure such that they are adapted to pass through the isolated perforations of said well casing, forcing said particulate solid material under fluid pressure through said isolated perforations of said casing string, said particles of solid material being expanded to prevent their free flow back through the perforations, subsequently pumping a sealing fluid down said pipe string and through said isolated perforations and into the interstices of said mass of particulate solid material to form an impermeable mass effectively sealing off said formation to be sealed, withdrawing said pipe string and packer means from said well casing, inserting a pipe string through said casing string until the lower end of said pipe string is opposite said lowermost producing formation, pumping a liquid down said pipe string to wash out said sand pack, withdrawing said pipe string from said well casing, and subsequently producing fluid from said lowermost hydrocarbon-producing formation.

References Cited in the file of this patent

UNITED STATES PATENTS

| | | | |
|---|---|---|---|
| 2,300,325 | Van Leeuwen | Oct. 27, | 1942 |
| 2,649,159 | Boyer | Aug. 18, | 1953 |
| 2,693,854 | Abendroth | Nov. 9, | 1954 |
| 2,716,456 | Brown | Aug. 30, | 1955 |
| 2,768,693 | Hughes | Oct. 30, | 1956 |
| 2,823,753 | Henderson et al. | Feb. 18, | 1958 |
| 3,005,492 | Mathieson et al. | Oct. 24, | 1961 |